US008471168B2

(12) United States Patent
Ganesh

(10) Patent No.: US 8,471,168 B2
(45) Date of Patent: Jun. 25, 2013

(54) METHODS OF TREATING METAL ARTICLES AND ARTICLES MADE THEREFROM

(75) Inventor: Swami Ganesh, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 1406 days.

(21) Appl. No.: 12/142,242

(22) Filed: Jun. 19, 2008

(65) Prior Publication Data

US 2009/0314758 A1 Dec. 24, 2009

(51) Int. Cl.
*B23K 26/34* (2006.01)

(52) U.S. Cl.
USPC ... 219/73; 219/76.1; 219/121.63; 219/121.64

(58) Field of Classification Search
USPC ......... 219/73, 76.1, 121.63, 121.64; 228/119; 29/889.1
See application file for complete search history.

(56) References Cited

U.S. PATENT DOCUMENTS

| 5,846,057 | A  | * | 12/1998 | Ferrigno et al. ........... 416/241 R |
|---|---|---|---|---|
| 6,623,579 | B1 |   | 9/2003  | Smith et al. |
| 6,637,643 | B2 |   | 10/2003 | Hasz et al. |
| 6,960,395 | B2 |   | 11/2005 | Spitsberg et al. |
| 2003/0029845 | A1 |   | 2/2003 | Tamura et al. |
| 2005/0067466 | A1 | * | 3/2005 | Boegli et al. .................. 228/119 |
| 2007/0125458 | A1 | * | 6/2007 | Kawasaki et al. ............. 148/414 |
| 2009/0057275 | A1 | * | 3/2009 | Chen et al. ................... 219/76.1 |

FOREIGN PATENT DOCUMENTS

| EP | 0993898 A1 | 4/2000 |
|---|---|---|
| EP | 1932928 A1 | 6/2008 |
| JP | 2006122969 A | 5/2006 |

OTHER PUBLICATIONS

European Search Report; Application No. 09162518.6; Date: Oct. 8, 2009; 4 Pages.
Japanese Patent No. 2006122969; Publication Date: May 18, 2006; Abstract Only; 1 Page.
Jayaraman, N., et al, Application of Low Plasticity Burnishing (LPB) to improve the corrosion fatigue performance and FOD tolerance of alloy 450 stainless steel, Proceedings of the Tri-Service Corrosion Conference, Las Vegas, NV, Nov. 17-21, 2003.
Chen, D., et al.; Mechanisms of High Temperature Fatigue in Silicon Carbide Ceramics; Fatigue and Fracture Behavior of High Temperature Materials; pp. 1-8, The Minerals, Metals & Materials Society 2000 Fall Meeting, St. Louis, Missouri, USA, Oct. 8-12, 2000.
Shirato K., et al.; High Temperature Cyclic Fatigue-Crack Growth in Monolithic Ti3SiC Ceramics; Fatigue and Fracture Behavior of High Temperature Materials; Peter K. Liaw Editor; pp. 71-75, The Minerals, Metals & Materials Society 2000 Fall Meeting, St. Louis, Missouri, USA, Oct. 8-12, 2000.
Prevey, Paul S., et al.; Improved HCF Performance and FOD Tolerance of Surface Treated Ti-6-2-4-6 Compressor Blades; 9th National Turbine Engine High Cycle Fatigue Conference; Pinehurst, North Caroline, Mar. 16-19, 2004.
Singh, Nirbhay, et. al., Effect of stress ratio and frequency on fatigue crack growth rate of 2618 aluminum alloy silicon carbide metalmatrix composite; Bull. Mater. Sci., vol. 24, No. 2, Apr. 2001, pp. 169-171.

\* cited by examiner

*Primary Examiner* — Brian Jennison
(74) *Attorney, Agent, or Firm* — Cantor Colburn LLP

(57) ABSTRACT

A method for treating a metal article can comprise: fusion welding a cladding onto an article comprising a surface and a compressive case depth processing the cladding. An average compression case depth, as measured from the cladding outer surface, can be greater than the cladding thickness. Also included herein are articles made from this method.

20 Claims, 5 Drawing Sheets

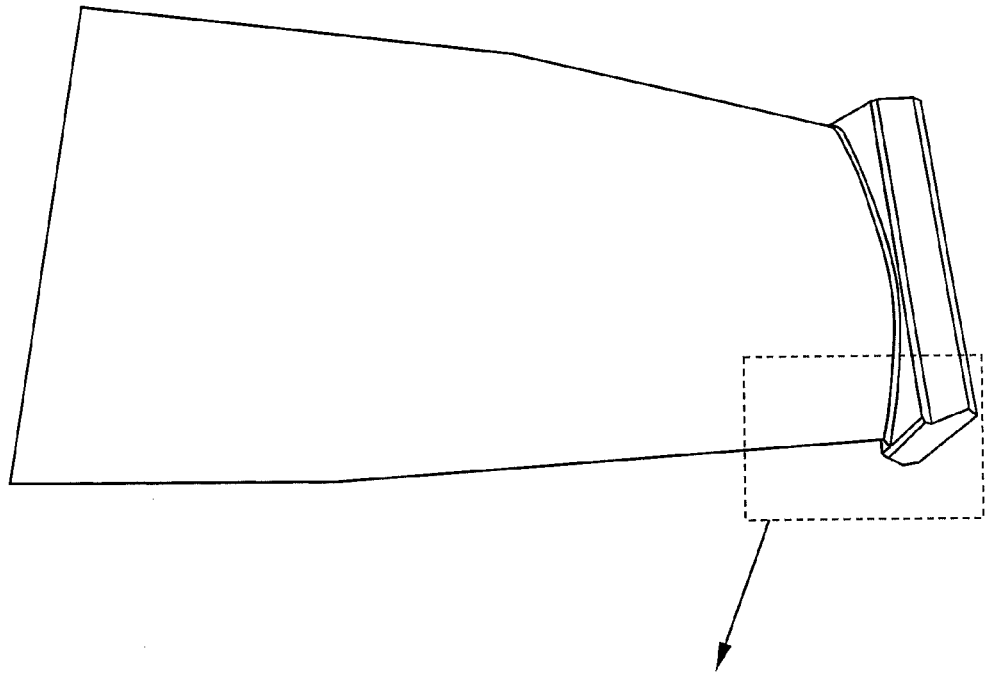
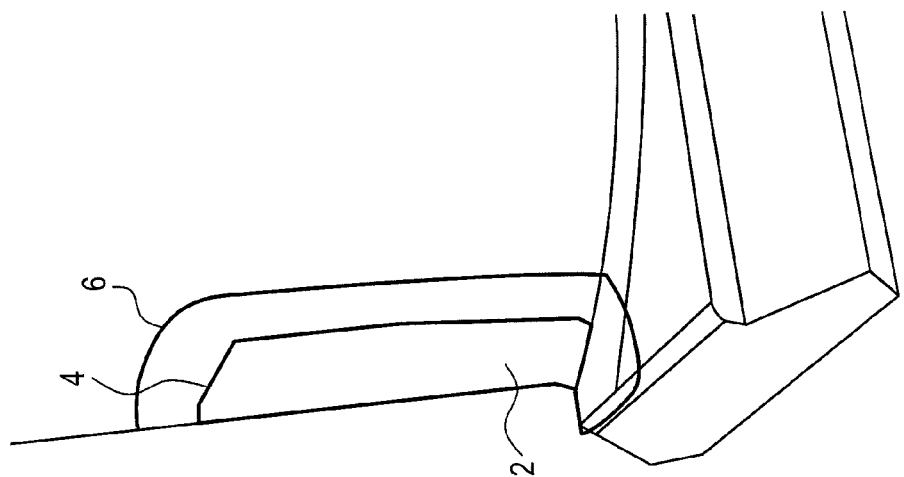

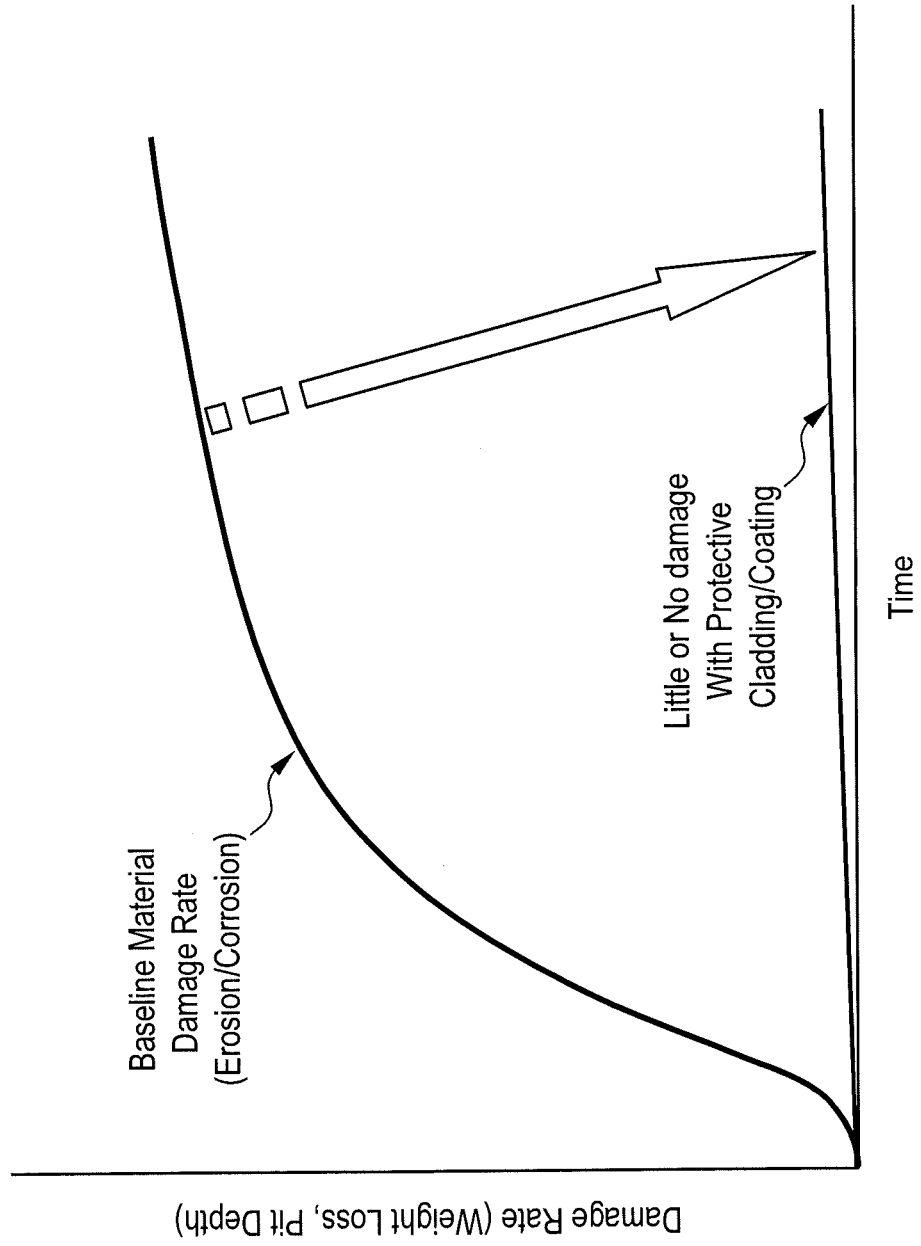

METHODS OF TREATING METAL ARTICLES AND ARTICLES MADE THEREFROM

TECHNICAL FIELD

This disclosure generally relates to methods for treating metals, more specifically, to methods for treating metals to improve durability in harsh environments.

BACKGROUND

Rotating turbine components can suffer premature failure due to loss of fatigue capability that can result from surface damage caused during manufacturing, assembly or operation. Such surface damage includes manufacturing defects such as forging defects, surface roughness, gouges, notches, tensile residual stresses, metallic inclusions, chemical segregation, oxide defects, etc., and service induced defects such as erosion induced by solid particles or water droplets, corrosion pitting, stress corrosion cracking, foreign object damage, rubbing, fretting, or sliding wear, etc.

A method of enhancing fatigue capability includes application of various types of surface enhancement techniques with various means of applying them such as thermal spray, plating, cladding, physical or chemical vapor deposition, gas or ion nitriding, induction or flame hardening, carburizing, and boriding. Unfortunately, no single technique is effective against all damage mechanisms. Thin coatings lack durability under operating conditions while thick coatings tend to spall off or induce loss of fatigue capability due to parent metal surface damage caused by the coating application process, heat affected zone, coating defects, coating brittleness, chemical alteration of the substrate, thermal expansion mismatch with the parent metal, and/or other incompatibilities caused by the differences in the physical, chemical and/or mechanical characteristics between the coating and the parent metal.

As a result of above concerns there is a need for a dual protection method that will not only provide resistance to the damage mechanisms indicated above, but also provide high tolerance to damage that might occur from the application of a protective layer (e.g., coating) or from the sudden or progressive loss of the protective layer during service.

BRIEF SUMMARY

Disclosed herein are methods for treating metal articles, and articles made therefrom.

In one embodiment a method for treating a metal article can comprise: fusion welding a cladding onto an article comprising a surface and a compressive case depth by peening the cladding. An average compression case depth, as measured from the cladding outer surface, can be greater than the cladding thickness.

The above described and other features are exemplified by the following figures and detailed description.

BRIEF DESCRIPTION OF THE DRAWINGS

Refer now to the figures, which are exemplary embodiments, and wherein the like elements are numbered alike.

FIG. 2 is a view of an exemplary turbine blade.

FIG. 3 is an expanded view of a leading edge section of the turbine blade of FIG. 2, FIG. 4 is an exemplary graph illustrating the significant reduction in the damage rate of base material with the application of the surface enhancement process.

DETAILED DESCRIPTION

Figure 1:
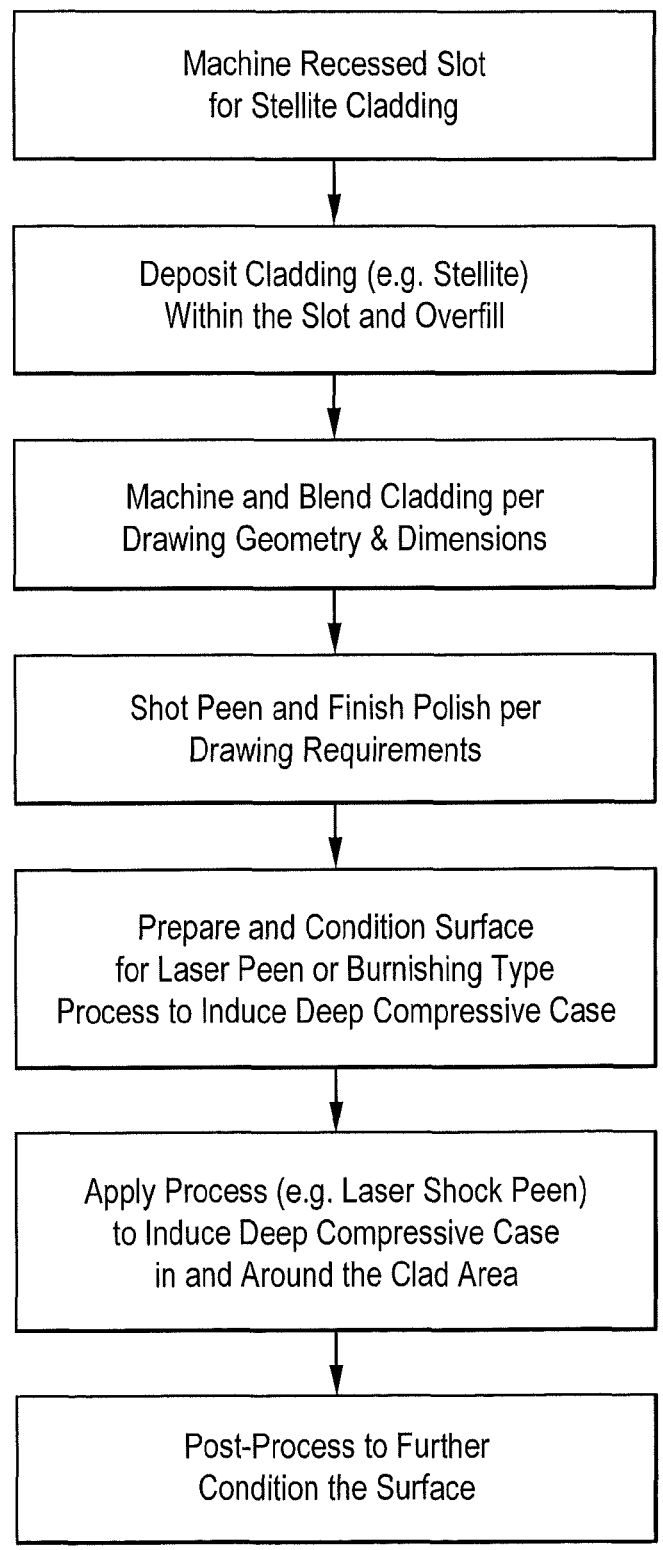
FIG. 1 is an exemplary flow chart illustrating one exemplary surface enhancement process.

Disclosed herein are methods for achieving long-term protection against damage mechanisms as well as well as high tolerance to surface damage that might penetrate past the coating or occur where the coating is worn off from aggressive operating conditions. While there are many coatings available for protection against specific damage mechanisms (e.g., corrosion, fretting, erosion) no single coating can satisfy all requirements. For instance, the coatings applied by the deposition methods (physical, chemical), tend to be thin (less than 0.005 inches (0.127 millimeters (mm)), porous, and/or brittle, and are mechanically bonded (e.g., adhered) to the article, and, therefore, lack long-term durability under aggressive operating conditions. Spray coatings, e.g., thermal spray coatings (plasma, HVOF, and so forth) although they have a thickness of up to 0.020 inches (0.51 mm), are similarly porous and/or brittle, are merely mechanically bonded, and lack long-term durability under aggressive operating conditions. In rotating parts (e.g., turbine components such as blades, vanes, stators, and so forth), solid particles, liquid droplets, or ingested foreign objects can progressively or suddenly dislodge the protective coating.

Thick coatings (i.e., greater than 0.02 inches (0.51 mm), such as claddings applied by thermal fusion methods, are dense and metallurgically bonded to the article (e.g., fused to the article, e.g., such that interface of the article and cladding is a blend of the article and cladding). While these coatings can provide long-term durability, they tend to cause heat affected zone damage, cracking in the coating or the base metal heat affected zone, and/or induce high tensile residual stresses that could substantially lower the material capability.

To address the above problems that are either insufficiently rectified with the coating(s) and/or are caused by the coatings, a dual protection scheme has been devised comprising applying a thick (greater than or equal to 0.02 inches (0.51 mm)), highly durable, protective coating (e.g., cladding) followed by a process (e.g., laser shock peening and/or low plasticity burnishing) that induces a deep compressive compressive case (e.g., residual stress layer) (greater than the thickness of the cladding) to provide tolerance to deep defects that might result from the coating process, or surface or near surface damages that might occur during manufacturing or service. Hence, disclosed herein are methods for treating metal articles, such as turbine blades, in order to provide both damage resistance as well as damage tolerance. This employs a synergistic combination of processes.

Unexpectedly, it was discovered that with a combination of processes comprising both deep compressive case process and the thick coating damage resistant layer, that a damage tolerance and damage resistance synergy is attained. It is know that cladding reduces high cycle fatigue (HCF) capability and deep compressive case processing also reduces HCF capability. Considering that cladding reduced the high cycle fatigue capability of the virgin material, it was wholly unexpected that an article with cladding would synergistically react to deep compressive case processing (e.g., laser shot peening and/or low plasticity burnishing) to attain a high cycle fatigue capability of greater than that achieved with only deep compressive case processing and even greater than the virgin material.

Damage resistance protects the base material against aggressive operating conditions that can promote damage through mechanisms such as erosion induced by solid particles or water droplets in the air stream, corrosion pitting induced by corrosive environments in combination with porous or discontinuous deposits or stress corrosion cracking in the presence of corrodents, tensile stresses, and/or susceptible material condition.

Damage resistance can be provided by a variety of coatings using various coating techniques (e.g., thermal spray, plating, physical deposition, and/or chemical deposition). However, most of these coatings are limited in thickness and are unlikely to provide long-term durability in aggressive environments encountered in rotating turbine blades. In addition, the surface preparation required for these coatings (e.g., dry grit blast), as well as the coating process itself, can lower the fatigue capability of the base material. Metal cladding of wear (e.g., erosion and/or corrosion) resistant materials (e.g., hard coatings such as (stellite, tungsten carbides, and others) applied by any of the fusion welding processes (e.g., laser welding, plasma welding, tungsten inert gas ("TIG") welding, and so forth) can provide metallurgically bonded protective layer of sufficient thickness for long-term durability. As used herein, cladding is intended to include metallic coatings having a thickness of greater than or equal to inches 0.015 inches (0.381 millimeters (mm)). Specifically, the cladding can have a thickness of 0.015 inches (0.381 (mm) to 0.25 inches (6.4 mm), or, more specifically, 0.020 inches (0.51 mm) to 0.15 inches (3.81 mm), or, yet more specifically, 0.020 inches (1.2 mm) to 0.05 inches (1.27 mm).

To avoid the high hardness (Knoop hardness of greater than or equal to 400, e.g., 400 to 550) in the heat affected zone adjacent to the cladding, the first layer of the cladding can comprise a relatively soft material (e.g., Knoop harness of less than or equal to 350, e.g., 200 to 350) compatible with the base metal and the cladding material (e.g., a metal or metal alloy interlayer such as a nickel and/or nickel alloy interlayer), with the subsequent layers being the cladding material (e.g., stellite). The thickness of the interlayer can be less than or equal to 20% of the thickness of the overall interlayer and cladding. For example, the interlayer can have a thickness of 0.005 inches (0.127 mm) to 0.015 inches (0.381 mm). The use of such interlayers can lower the risk of stress corrosion cracking, fatigue loss, and/or toughness loss, in the heat affected zone of the cladding.

As the cladding is disposed on the article, heat affected zones are formed. The heat affected zone(s) and the tensile residual stresses associated with the cladding process could cause significant loss of fatigue capability. High damage tolerance to overcome fatigue loss from coating or cladding process can be achieved by inducing significant depth (greater than the depth of the combined cladding and any interlayer) of residual compressive stress. Desirably, the average compressive case depth exceeds the depth of the cladding (as measured from an outer surface of the cladding, through the cladding, to the article), and more desirably, further exceeds the depth of the associated heat affected and/or mechanically deformed layer. It has been discovered that general shot peening is not capable of inducing the high depth of compressive residual stress needed to overwhelm the coating or cladding affected zone (e.g., typically conventional shot peening can attain a compressive case depth of less than or equal to 0.015 inches (0.381 mm)). Therefore, methods such as laser shock peening ("LSP") and/or low plasticity burnishing ("LPB") are employed to provide the desired compressive case depth. Laser shock peening and low plasticity burnishing can attain an average compressive case depth of greater than or equal to 0.05 inches (1.27 mm), or, specifically, greater than or equal to 0.075 inches (1.90 mm), or, more specifically, greater than or equal to 0.10 inches (2.54 mm).

The flow chart of FIG. 1 illustrates an exemplary surface enhancement process. The process includes creating an area (e.g., a slot) in the articles to receive the cladding. Although the slot is not needed to attain the present synergistic results, it is typically employed to meet a desired component specification. The area can have a geometry to meet the desired size (depth, width, and height) of the combined cladding and optional interlayer. The cladding and optional interlayer can then be disposed into the area. Optionally, overfill of the cladding can be removed by machining and blending (e.g., grinding and polishing) of the cladding to the desired specifications for the article. Once the cladding is in place, the surface can optionally be prepared and/or conditioned for the residual compressive stress processing. Preparation of the surface can, for example, comprise heat treatment (e.g. stress relief treatment), chemical processing, tumbling, blending, polish, and/or shot peening. The deep residual compressive stress processing can comprise laser shock peening and/or low plasticity burnishing the cladded surface, and the adjacent area around the cladded surface. Subsequent to the residual compressive stress processing, the surface can then optionally be further processed as desired. For example, a post-processing can be employed to remove damages (e.g., glass bead peening can be employed to smooth the surface and/or remove additional residual stresses such as tensile stresses), and/or the processed area can be further polished if needed (e.g., vibratory polishing).

Hence, it is understood, that the present process comprises employing fusion welding process (e.g., laser cladding, plasma reverse arc, tungsten inert gas, and so forth) processes to clad a desired area of the article, and then a compressive case depth peening process (to an average compressive case depth, as measured from the surface of the cladding, of greater than the cladding depth). Optionally, various preparations and processing can occur before, between, and/or after these processes to prepare, clean, or further process the article. Some possible processes include cleaning (e.g., ultrasonic, solvent bath, and so forth), surfacing (e.g., grit blasting, EDM, grinding, polishing), machining (e.g., EDM, grinding), surface modification (e.g., local heat treating, peening, peening and so forth).

FIG. 2 is a prospective view of an exemplary turbine blade, while FIG. 3 is an expanded view of a leading edge section 3 from FIG. 2. The leading edge section, as is illustrated in FIG. 3, can comprise cladding 2 disposed in a slot 4, with section 6 illustrating the area processed to achieve the desired compressive residual stress around the clad area. For example, up to 0.5 inches (12.7 mm) around the clad area can be processed. In one embodiment, 0.25 inches (6.35 mm) to 0.375 inches (9.52 mm) around the clad area can be processed.

FIG. 4 is a graphical illustration of damage (e.g., weight loss, pit depth) versus time. As can be seen, a huge reduction in damage rate is attained via the application of protective cladding or coating (e.g., stellite) on the part exposed to aggressive operating conditions.

Figure 5:
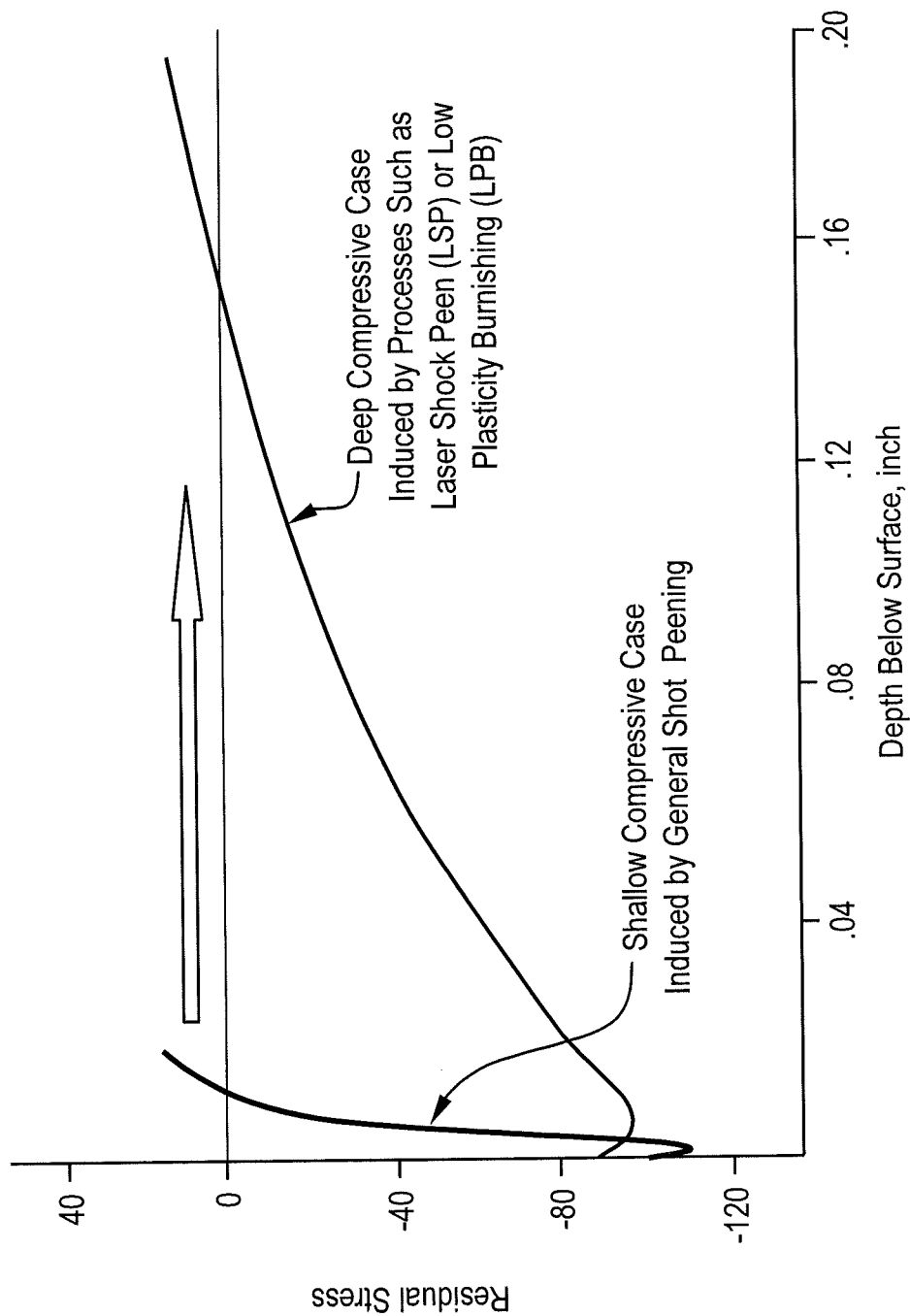
FIG. 5 is an exemplary graph illustrating the increase in the depth of compressive residual stress achieved by special surface processes such as laser shock peen or low plasticity burnishing.

FIG. 5 is a graphical illustration of residual stress versus depth below the surface of the article. As can be seen, a large increase in compressive residual stress depth is achievable with processes such as laser shock peen (LSP) (laser shock peen uses shock waves) and low plasticity burnishing (LPB) compared to a shot peen process using shot (e.g., spherical cast shots or conditioned cut wire (wrought) shots made of steel, stainless steel, ceramic, or glass) that physically strikes the surface of the material. The compressive case depth can provide tolerance to deep surface damage.

Figure 6:
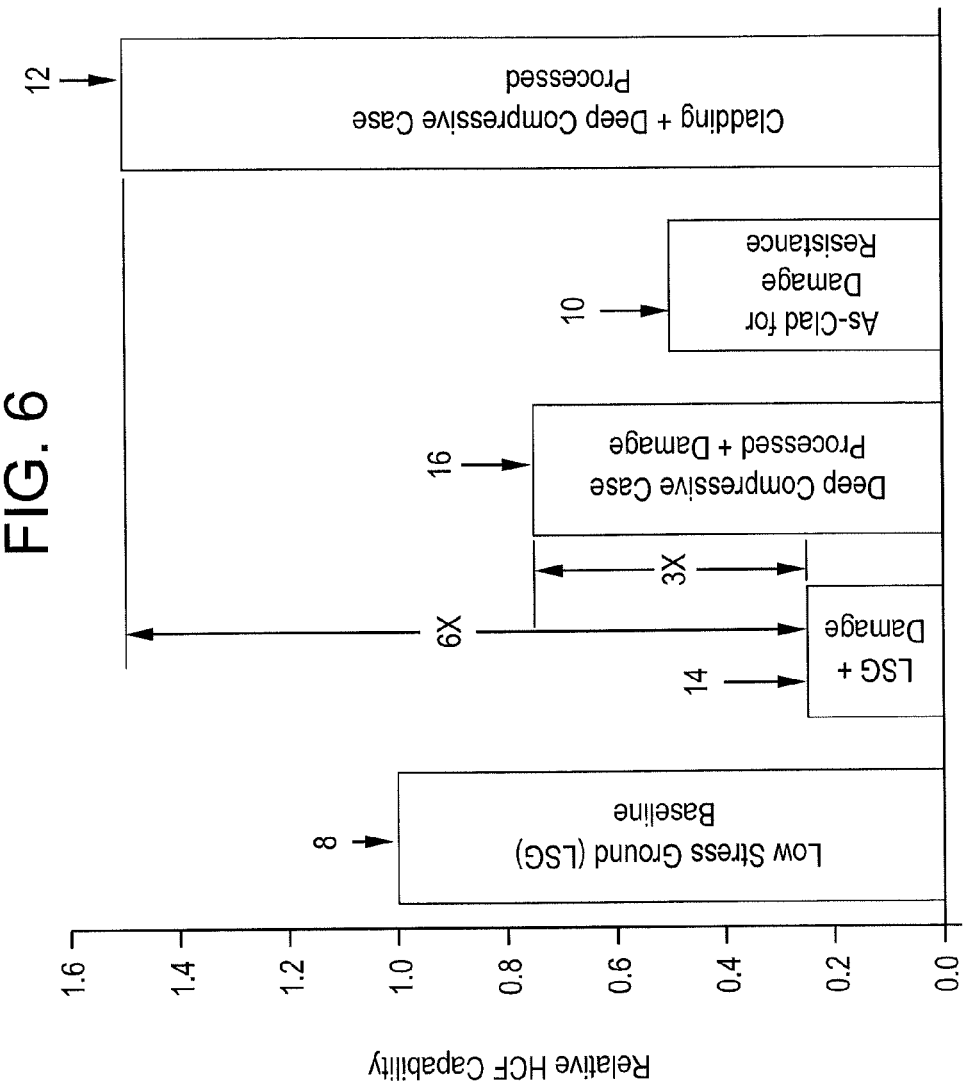
FIG. 6 is an exemplary bar graph illustrating the effects of deep compressive case inducing process on enhancing the fatigue capability in the presence of damage caused during service or by the surface enhancement process (e.g. cladding, coating).

Finally, FIG. 6 is a graphical illustration of estimated high cycle fatigue capability curves showing alternating stress (mean to peak stress) versus mean stress. This figure illustrates the huge damage tolerance enhancement due to deep compressive case achieve by processes such as laser shock peen (LSP) or low plasticity burnishing. Line 8 illustrates the results attained on the base (parent) metal in the low stress ground condition achieved by polishing the surface such that the polishing lay marks are parallel to the loading direction and the surface stresses are close to zero or slightly compressive. This line represents the virgin, undamaged, base material capability without the deep compressive case process (e.g., laser shock peening) and without cladding. Line 14 illustrates the potential loss in fatigue capability to the virgin material resulting from damage caused during manufacturing (melting defects, forging defects, heat treatment effects, quench cracks, machining damage, surface roughness, tensile stress, and so forth) and/or operation (erosion, corrosion, pitting, foreign object damage, wear, and so forth) without the cladding or the deep compressive case process. Line 10 illustrates the loss in high cycle fatigue capability on the undamaged virgin base metal resulting from the cladding/coating process caused by the heat affected zone containing a range of grain size and microstructure, or the high tensile residual stress in the coating and/or the heat affected zone due to thermal gradients and differential thermal expansion effects or the surface damage caused by the preparation of the surface prior to cladding or coating (e.g. electrical discharge machining, milling, dry grit blasting and so forth). Line 16 illustrates the loss in high cycle fatigue capability on the undamaged virgin base metal resulting from the compressive case depth processing. Line 12 illustrates the synergistic effect of the combined deep compressive case process (e.g. laser shock peening) providing high damage tolerance and the cladding that provide long lasting damage resistance. Line 12 illustrates the significant tolerance, even with the same damage as experienced in line 14 and line 10.

As is clear from the figures, the synergistic process results in an article comprising greatly enhanced damage tolerance resulting from deep compressive residual stress layer as well as damage resistance to aggressive service conditions (e.g. erosion, corrosion, pitting, foreign object damage, wear, and so forth). Even with damage mechanisms mentioned above from the article has high cycle fatigue capability equaling or exceeding the original, virgin, undamaged material condition.

Unless defined otherwise, technical and scientific terms used herein have the same meaning as is commonly understood by one of skill in the art to which this invention belongs. Ranges disclosed herein are inclusive and combinable (e.g., ranges of "up to 25 wt %, or, more specifically, 5 wt % to 20 wt %", is inclusive of the endpoints and all intermediate values of the ranges of "5 wt % to 25 wt %," etc.). "Combination" is inclusive of blends, mixtures, alloys, reaction products, and the like. Furthermore, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The suffix "(s)" as used herein is intended to include both the singular and the plural of the term that it modifies, thereby including one or more of that term (e.g., the colorant(s) includes one or more colorants). The notation "±10%" means that the indicated measurement can be from an amount that is minus 10% to an amount that is plus 10% of the stated value. Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments and are not limited to the specific combination in which they are discussed.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for treating a metal article comprising:
   fusion welding a cladding onto an article comprising an article surface, wherein the cladding has a cladding outer surface located on a side of the cladding opposite the article surface; and,
   compressive case depth processing the cladding until attaining an average compressive case depth, as measured from the cladding outer surface, of greater than or equal to 0.05 inches (1.27 mm), wherein the average compressive case depth is greater than the cladding thickness.

2. The method of claim 1, wherein the fusion welding comprises multi layer cladding of a wear resistant material.

3. The method of claim 1, wherein the compressive case depth processing comprises laser shock peening and/or low plasticity burnishing.

4. The method of claim 1, wherein the average compressive case depth is greater than or equal to 0.075 inches (1.90 mm).

5. The method of claim 1, wherein the average compressive case depth is greater than or equal to 0.10 inches (2.54 mm).

6. The method of claim 1, wherein the fusion welding comprises a process selected from the group consisting of laser welding, plasma welding, and tungsten inert gas welding.

7. The method of claim 1, further comprising forming a recess in the article for receiving the cladding, wherein the cladding is fusion welded into the recess.

8. The method of claim 1, further comprising post processing the article after the compressive case depth processing.

9. The method in claim 1, further comprising pre-processing the article before the compressive case depth processing, wherein the pre-processing is selected from the group consisting of shot peening, polishing, blending, tumbling, chemical processing, and combinations comprising at least one of the foregoing pre-processing.

10. The method of claim 1, wherein the article is a turbine blade comprising a leading edge, and wherein the cladding is fusion welded to a recess in the leading edge.

11. The method of claim 1, further comprising compressive case depth processing the article in an area around the cladding.

12. The method of claim 1, comprising fusion welding an interlayer between the article and the cladding.

13. The method of claim 1, wherein the cladding has a thickness of greater than 0.02 inches (0.51 mm).

14. An article formed by a process comprising:
fusion welding a cladding onto an article, wherein the cladding has a thickness and a cladding outer surface on a side of the cladding opposite the article; and,
compressive case depth processing the cladding, wherein an average compressive case depth, as measured from the cladding outer surface, is greater than the cladding thickness, and wherein the average compressive case depth is greater than or equal to 0.05 inches (1.27 mm).

15. A method for treating a metal article comprising:
preparing an area in the article to receive a cladding;
fusion welding a cladding onto the article comprising an article surface, wherein the cladding has a cladding outer surface located on a side of the cladding opposite the article surface; and,
forming a processed article by at least one of laser shock peening and low plasticity burnishing the cladding and the article around the cladding to form the processed article, wherein the article is processed until achieving an average compressive case depth, as measured from the cladding outer surface, of greater than or equal to 0.05 inches (1.27 mm), wherein the average compressive case depth is greater than the cladding thickness.

16. The method of claim 15, wherein the cladding comprises an interlayer in contact with the article surface, and wherein the interlayer has an interlayer thickness of less than 20% of the cladding thickness.

17. The method of claim 15, further comprising heat treating the cladding.

18. The method of claim 17, wherein the cladding comprises an interlayer in contact with the article surface, and wherein the interlayer has an interlayer thickness of less than 20% of the cladding thickness.

19. The method of claim 14, further comprising shot peening the processed article.

20. The method of claim 15, wherein the article comprises ferrous alloy material such as steel or stainless steel.

* * * * *